Patented July 25, 1933

1,919,425

UNITED STATES PATENT OFFICE

PEDER FARUP, OF VETTAKOLLEN, VESTRE AKER, NORWAY, ASSIGNOR TO TITAN CO. A/S, OF FREDRIKSSTAD, NORWAY

PROCESS FOR DISSOLVING TITANIFEROUS MATERIALS IN ACIDS

No Drawing. Application filed April 21, 1927, Serial No. 185,657, and in Norway August 3, 1926.

The present invention relates to dissolution of titaniferous materials, for instance ilmenite, rutile, titanite or products thereof, and the principal object of the invention is to provide a process for bringing such materials directly into solution without employing finely ground materials or excess of acids.

I have made a systematic investigation as to the effect of sulphuric acid on ilmenite and similar materials under different conditions (as for instance when varying the factors of acid concentration, relative quantities, temperature, duration of reaction, mode of application) and I have found that the effectiveness of the dissolution process will as a rule increase with the fineness of the material, the concentration of the acid and the temperature. Special circumstances may however, change his rule, especially in cases where one of the constituents of the solution is separated out due to a hydrolytic decomposition or crystallization.

According to my present invention a rapidly proceeding dissolution process may be attained and at the same time a precipitation of the compounds of the solution may either be avoided or will take place in such a way that possible precipitates during the subsequent dilution are again easily brought into solution. The process consists in diluting the reaction mass during the dissolution process with a solution containing one or more acids, salts or mixtures thereof. In this way it is possible without concentration by evaporation to produce solutions with for example 100–150 grams $TiO_2$ per liter or more, besides salts of iron and other metals as may derive from the raw materials employed.

If a coarsely ground ilmenite is for instance treated with Glover-acid, it will be found that the boiling point of the resulting solution will gradually sink, possibly on account of an altered degree of dissociation of the molecules of the solution, or because a precipitation takes place on one or more of the compounds present in the solution. According to my present process however, the solution is gradually diluted, whereby such precipitation or crystallization is avoided or reduced and consequently a sufficiently fluid solution is always obtained. The dilution may take place continuously or discontinuously and may also be effected by addition of water, but I prefer to dilute by means of an aqueous solution of acid or salt or mixtures thereof. Dilution with water will readily produce a local hydrolytic decomposition while this is not, or at least only to a smaller degree, the case with solution of acids or salts, which are better solvents for possibly precipitated substances formed during the dissolution process.

Solutions from various steps in the subsequent processes for production of the desired titanium compounds may also and with advantage be employed as diluting agents. A suitable diluting agent is for instance the solution obtained by washing of the non-dissolved residue from the raw material used, or, also, the solution remaining after the titanic acid has been wholly or partly removed by hydrolytic decomposition. Such a solution contains considerable quantities of free acid, which are thus utilized. On account of the fact that the boiling point of the sulphuric acid solution gradually sinks as the process proceeds, it will be suitable to carry out the process at sinking temperature. The process may for example be started at about 170° C. and be terminated at about 130° C. This interval of temperature will to a great deal depend on the strength of the acid employed, as well as on the composition of the titanium material employed.

The practical application of the process may of course vary in many ways and must be modified according to the preferred apparatus. It may be carried out continuously or discontinuously and as well in stationary vats with stirrers, as in rotating vats or other apparatus in which the mass may be kept in motion. It may also be effected by means of a circulation or percolation principle. In most cases it will be advantageous to start the dissolution process with a sulphuric acid of about 80% concentration (Glover-acid), but there is no objection to employing a sulphuric acid of higher or lower concentration. If another acid or acid mixture is chosen for the process, the concentration must be chosen according to the qualities of the acid and the general conditions. The process may also wholly or partly be carried out at a pressure higher than the atmospheric pressure, whereby the dissolution process will be accelerated, but in that case the temperature must not rise so much that a hydrolytic precipitation of a titanic acid takes place, which is difficulty soluble in a possibly following dilution process.

It will generally be advantageous to employ a greater amount of titanium material than that which theoretically corresponds to the amount of solvent employed. It is also advantageous to return to the dissolution process undissolved residue of titaniferous materials from previous dissolution, which materials may or may not have been freed from gangue and slimes. Such a return may if desired be effected together with the above mentioned return of solution for diluting purposes.

As to the dilution during the dissolution, this may take place within rather wide limits. The amount of diluting agent to be employed to a great extent depends on how it is desired to have the dissolution process proceed. As a rule it may be said that the mass should be diluted at least to the point where it acquires a suitable fluidity. It may, however, in many cases also be necessary to dilute considerably more to prevent precipitation. Very often it is not desired that the final solutions have a high concentration on account of the subsequent treatment.

The last dilution may also be effected after the actual dissolution process has been completed or to the greater extent completed, or, also, after the remaining undissolved titanium material has been removed from the solution.

According to my present process the composition of the titaniferous solutions produced may vary within wide limits, as well with regard to the relative proportions of the ions of the solution, for instance the proportion of acids and bases, as with regard to the type of the single ion. The solution may thus be acid, neutral or alkaline.

The titaniferous solution produced may be treated further according to known methods. The solution may be freed from suspended particles and also from colloidal substances, it may be subjected to crystallization, reduction etc., and is well suited for production of titanium compounds and for hydrolytic precipitation of titanic acids, either alone or together with other substances.

My process may also be employed in the cases where additions or reaction accelerators are used during the dissolution to get more rapidly proceeding processes.

What I claim as new and desire to secure by Letters Patent is:

1. The process of bringing titaniferous material into solution directly from its ore, while avoiding or minimizing precipitation and maintaining a sufficiently fluid solution, comprising adding sulphuric acid to the ore and gradually diluting the solution with an acid solution during the dissolution process.

2. The process of bringing titaniferous material into solution directly from its ore, while avoiding or minimizing precipitation and maintaining a sufficiently fluid solution, comprising adding sulphuric acid to the ore and gradually diluting the solution during the dissolution process with a solution obtained by washing the non-dissolved residue of a previous dissolution process.

3. The process of dissolving titaniferous ore, which comprises adding sulphuric acid to the ore and gradually diluting the solution with an acid solution during the dissolution process, said dissolution process being carried out at gradually sinking temperatures substantially between 170° C. and 130° C.

4. The process of bringing titaniferous material into solution directly from its ore, comprising adding sulphuric acid of about 80% concentration to the ore and gradually diluting the solution during the dissolution process with an aqueous acid solution.

5. The process of bringing titaniferous material into solution directly from its ore, comprising adding sulphuric acid to the ore and gradually diluting the solution during the dissolution process with an acid solution, the amount of titaniferous material employed being greater than that which theoretically corresponds to the amount of acid used.

6. The process of bringing titaniferous material into solution directly from its ore, while maintaining a sufficiently fluid solution, comprising adding sulphuric acid to the ore and gradually diluting the solution with additions of dilute acid, the amount of titaniferous material employed being greater than that which theoretically corresponds to the amount of acid employed.

7. The process of bringing titaniferous material into solution directly from its ore, comprising adding sulphuric acid to the ore and gradually diluting the solution with an acid solution during the dissolution process and after the actual dissolution process has been completed.

8. The process of bringing titaniferous material into solution directly from its ore, comprising adding sulphuric acid to the ore in amounts less than that theoretically corresponding to the amount of titaniferous material, gradually diluting the solution with an acid solution, said dissolution process being carried out at gradually sinking temperatures and under pressure greater than atmospheric pressure.

PEDER FARUP.